(12) United States Patent
Lo et al.

(10) Patent No.: US 12,323,840 B2
(45) Date of Patent: Jun. 3, 2025

(54) DEVICE AND METHOD FOR HANDLING A REFERENCE SIGNAL REPORTING

(71) Applicant: ACER INCORPORATED, New Taipei (TW)

(72) Inventors: Li-Chung Lo, New Taipei (TW); Chien-Min Lee, New Taipei (TW); Jen-Hsien Chen, New Taipei (TW)

(73) Assignee: ACER INCORPORATED, New Taipei (TW)

( * ) Notice: Subject to any disclaimer, the term of this patent is extended or adjusted under 35 U.S.C. 154(b) by 442 days.

(21) Appl. No.: 17/879,783

(22) Filed: Aug. 3, 2022

(65) Prior Publication Data
US 2023/0089382 A1    Mar. 23, 2023

Related U.S. Application Data

(60) Provisional application No. 63/245,199, filed on Sep. 17, 2021.

(51) Int. Cl.
*H04W 24/10*    (2009.01)
*H04L 5/00*     (2006.01)
(Continued)

(52) U.S. Cl.
CPC ........... *H04W 24/10* (2013.01); *H04L 5/0051* (2013.01); *H04W 16/28* (2013.01); *H04W 74/0833* (2013.01)

(58) Field of Classification Search
CPC . H04W 24/10; H04W 16/28; H04W 74/0833; H04W 24/08; H04W 72/0446;
(Continued)

(56) References Cited

U.S. PATENT DOCUMENTS

2019/0281480 A1   9/2019  Wei
2019/0289552 A1*  9/2019  Jain ..................... H04B 7/0626
(Continued)

FOREIGN PATENT DOCUMENTS

CN   113766528 A  * 12/2021
EP   4 016 860 A1    6/2022
(Continued)

OTHER PUBLICATIONS

Mediatek Inc., Further Details on Beam Failure Recovery, 3GPP TSG RAN WG1 Meeting #91, R1-1719566, Nov. 27-Dec. 1, 2017, Reno, USA, XP051369380.
(Continued)

*Primary Examiner* — Sujoy K Kundu
*Assistant Examiner* — Raul Rivas
(74) *Attorney, Agent, or Firm* — Winston Hsu

(57) ABSTRACT

A communication device for handling a reference signal (RS) reporting includes at least one storage device; and at least one processing circuit, coupled to the at least one storage device, wherein the at least one storage device stores instructions, and the at least one processing circuit is configured to execute the instructions of: receiving at least one reference signal (RS) from a network; performing at least one measurement according to the at least one RS, to generate at least one measurement result; selecting an RS from the at least one RS according to the at least one measurement result; and determining whether to report the RS to the network.

21 Claims, 11 Drawing Sheets

(51) Int. Cl.
*H04W 16/28* (2009.01)
*H04W 74/0833* (2024.01)

(58) Field of Classification Search
CPC ......... H04W 72/0453; H04W 72/1268; H04W 72/21; H04W 72/231; H04W 72/232; H04L 5/0051; H04L 5/0048; H04L 5/0053; H04B 7/088; H04B 7/0695
See application file for complete search history.

(56) References Cited

U.S. PATENT DOCUMENTS

| | | |
|---|---|---|
| 2020/0146059 A1 | 5/2020 | Cirik |
| 2020/0259703 A1 | 8/2020 | Cirik |
| 2021/0105176 A1 | 4/2021 | Tsai |
| 2022/0159523 A1* | 5/2022 | Xu ................... H04W 36/0072 |
| 2023/0291440 A1* | 9/2023 | Zhang ................ H04L 25/0222 |

FOREIGN PATENT DOCUMENTS

| | | | |
|---|---|---|---|
| EP | 4064751 A1 * | 9/2022 | ........... G01S 5/0036 |
| JP | 2019-531654 A | 10/2019 | |
| TW | I678895 B | 12/2019 | |
| WO | 2018/232090 A1 | 12/2018 | |
| WO | 2020/092752 A1 | 5/2020 | |
| WO | 2021/029755 A1 | 2/2021 | |

OTHER PUBLICATIONS

CMCC, Relationship between RLM and beam recovery, 3GPP TSG RAN WG1 Meeting NR#3, R1-1716048, Sep. 18-21, 2017, Nagoya, Japan, XP051329711.

* cited by examiner

DEVICE AND METHOD FOR HANDLING A REFERENCE SIGNAL REPORTING

CROSS REFERENCE TO RELATED APPLICATIONS

This application claims the benefit of U.S. Provisional Application No. 63/245,199, filed on Sep. 17, 2021. The content of the application is incorporated herein by reference.

BACKGROUND OF THE INVENTION

1. Field of the Invention

The present invention relates to a device and a method used in a wireless communication system, and more particularly, to a device and a method of handling a reference signal reporting.

2. Description of the Prior Art

A long-term evolution (LTE) system supporting the 3rd Generation Partnership Project (3GPP) Rel-8 standard and/or the 3GPP Rel-9 standard are developed by the 3GPP as a successor of the universal mobile telecommunication system (UMTS) for further enhancing performance of the UMTS to satisfy increasing needs of users. The LTE system includes a new radio interface and a new radio network architecture that provides high data rate, low latency, packet optimization, and improved system capacity and coverage. In the LTE system, a radio access network known as an evolved universal terrestrial radio access network (E-UTRAN) includes at least one evolved Node-B (eNB) for communicating with at least one user equipment (UE), and for communicating with a core network including a mobility management entity (MME), a serving gateway, etc., for Non-Access Stratum (NAS) control.

An LTE-advanced (LTE-A) system, as its name implies, is an evolution of the LTE system. The LTE-A system targets faster switching between power states, improves performance at the coverage edge of an eNB, increases peak data rate and throughput, and includes advanced techniques, such as carrier aggregation (CA), coordinated multipoint (CoMP) transmissions/reception, uplink (UL) multiple-input multiple-output (UL-MIMO), licensed-assisted access (LAA) (e.g., using LTE), etc. For a UE and an eNB to communicate with each other in the LTE-A system, the UE and the eNB must support standards developed for the LTE-A system, such as the 3GPP Rel-1X standard or later versions.

A next generation radio access network (NG-RAN) is developed for further enhancing the LTE-A system. The NG-RAN includes one or more next generation Node-Bs (gNBs), and has properties of wider operation bands, different numerologies for different frequency ranges, massive MIMO, advanced channel codings, etc.

The UE may report multiple reference signals (RSs) to the gNB when operating a beamforming (e.g., a UL multi-user MIMO (MU-MIMO)) with the gNB, for the gNB to perform a beam adjustment according to the reported RSs. However, the reported RSs may be outdated when the UE is at a high speed and the gNB may perform the beam adjustment improperly according to the outdated RSs. Accordingly, a probability of a beam failure is increased and a performance of the beamforming is degraded. Thus, it is important to solve the problem of reporting the outdated RSs when operating the beamforming.

SUMMARY OF THE INVENTION

The present invention therefore provides a device and a method for handling a reference signal reporting to solve the abovementioned problem.

A communication device for handling a reference signal (RS) reporting comprises at least one storage device; and at least one processing circuit, coupled to the at least one storage device, wherein the at least one storage device stores instructions, and the at least one processing circuit is configured to execute the instructions of: receiving at least one reference signal (RS) from a network; performing at least one measurement according to the at least one RS, to generate at least one measurement result; selecting a RS from the at least one RS according to the at least one measurement result; and determining whether to report the RS to the network.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
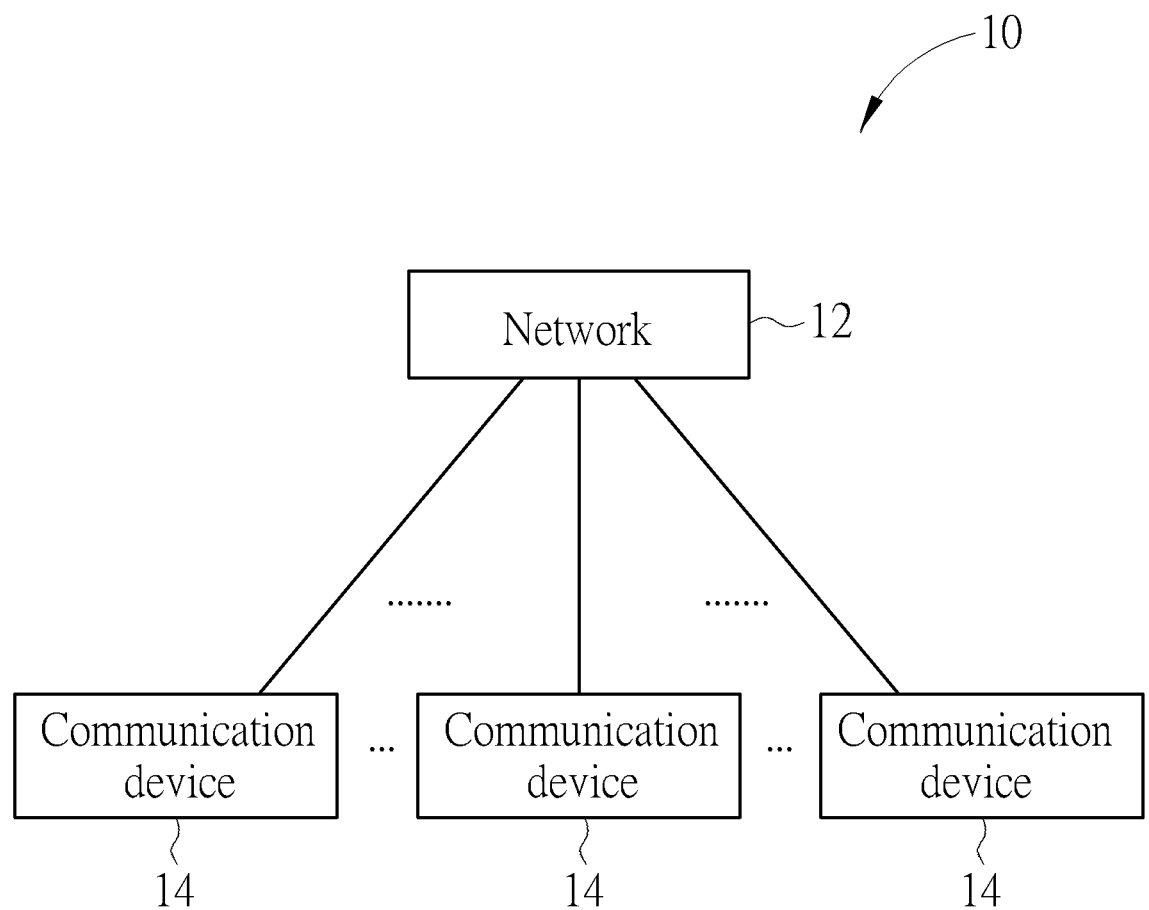
FIG. 1 is a schematic diagram of a wireless communication system according to an example of the present invention.

FIG. 1 is a schematic diagram of a wireless communication system 10 according to an example of the present invention. The wireless communication system 10 is briefly composed of a network 12 and a plurality of communication devices 14. The wireless communication system 10 may support a time-division duplexing (TDD) mode, a frequency-division duplexing (FDD) mode, a TDD-FDD joint operation mode, a non-terrestrial network (NTN) mode or a licensed-assisted access (LAA) mode. That is, the network 12 and the communication device 14 may communicate with each other via FDD carrier(s), TDD carrier(s), licensed carrier(s) (licensed serving cell (s)) and/or unlicensed carrier (s) (unlicensed serving cell(s)). In addition, the wireless communication system 10 may support carrier aggregation (CA). That is, the network 12 and the communication device 14 may communicate with each other via multiple serving cells (e.g., multiple serving carriers) including a primary cell (PCell) (e.g., primary component carrier) and at least one secondary cell (SCell) (e.g., secondary component carriers).

In FIG. 1, the network 12 and the communication devices 14 are simply utilized for illustrating the structure of the wireless communication system 10. Practically, the network 12 may be a universal terrestrial radio access network (UTRAN) including at least one Node-B (NB) in a universal mobile telecommunications system (UMTS). In one example, the network 12 is an evolved UTRAN (E-UTRAN) including at least one evolved NB (eNB) and/or at least one relay node in a long term evolution (LTE) system, an LTE-Advanced (LTE-A) system, an evolution of the LTE-A system, etc. In one example, the network 12 is a next generation radio access network (NG-RAN) including at least one next generation Node-B (gNB) and/or at least one fifth generation (5G) base station (BS). In one example, the network 12 is any BS conforming to a specific communication standard to communicate with the communication device 14.

A New Radio (NR) is a standard defined for a 5G system (or 5G network) to provide a unified air interface with better performance. gNBs are deployed to realize the 5G system, which supports advanced features such as enhanced Mobile Broadband (eMBB), Ultra Reliable Low Latency Communications (URLLC), massive Machine Type Communications (mMTC), etc. The eMBB provides broadband services with a greater bandwidth and a low/moderate latency. The URLLC provides applications (e.g., end-to-end communication) with properties of a higher reliability and a low latency. The examples of the applications include an industrial internet, smart grids, infrastructure protection, remote surgery and an intelligent transportation system (ITS). The mMTC is able to support internet-of-things (IoT) of the 5G system which include billions of connected devices and/or sensors.

Furthermore, the network 12 may also include at least one of the UTRAN/E-UTRAN/NG-RAN and a core network, wherein the core network may include network entities such as Mobility Management Entity (MME), Serving Gateway (S-GW), Packet Data Network (PDN) Gateway (P-GW), Self-Organizing Networks (SON) server and/or Radio Network Controller (RNC), etc. In one example, after the network 12 receives information transmitted by the communication device 14, the information is processed only by the UTRAN/E-UTRAN/NG-RAN and decisions corresponding to the information are made at the UTRAN/E-UTRAN/NG-RAN. In one example, the UTRAN/E-UTRAN/NG-RAN may forward the information to the core network, and the decisions corresponding to the information are made at the core network after the core network processes the information. In one example, the information is processed by both the UTRAN/E-UTRAN/NG-RAN and the core network, and the decisions are made after coordination and/or cooperation are performed by the UTRAN/E-UTRAN/NG-RAN and the core network.

The communication device 14 may be a user equipment (UE), a low cost device (e.g., machine type communication (MTC) device), a device-to-device (D2D) communication device, a narrow-band internet of things (IoT) (NB-IoT), a mobile phone, a laptop, a tablet computer, an electronic book, a portable computer system, or combination thereof. In addition, the network 12 and the communication device 14 can be seen as a transmitter or a receiver according to direction (i.e., transmission direction), e.g., for an uplink (UL), the communication device 14 is the transmitter and the network 12 is the receiver, and for a downlink (DL), the network 12 is the transmitter and the communication device 14 is the receiver.

Figure 2:
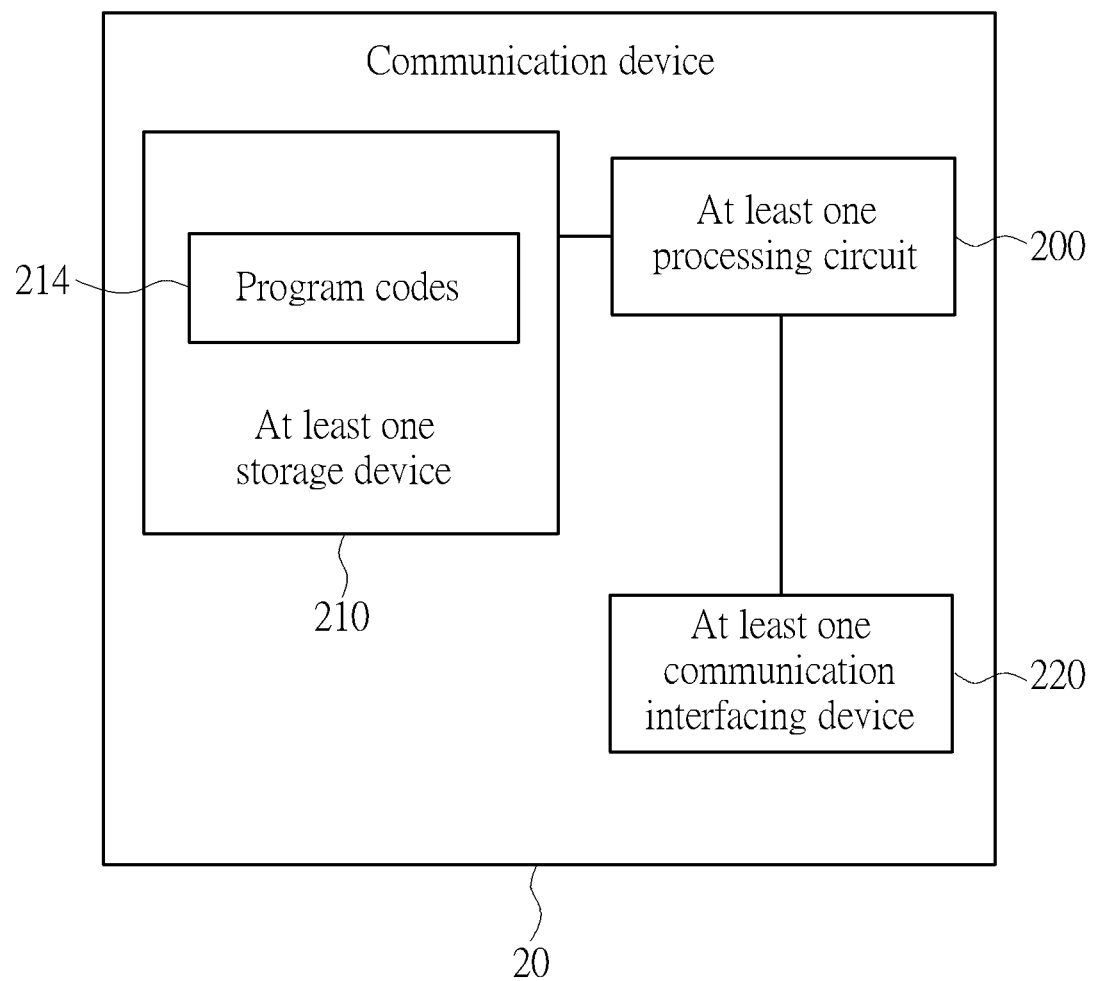
FIG. 2 is a schematic diagram of a communication device according to an example of the present invention.

FIG. 2 is a schematic diagram of a communication device 20 according to an example of the present invention. The communication device 20 may be the communication device 14 or the network 12 shown in FIG. 1, but is not limited herein. The communication device 20 may include at least one processing circuit 200 such as a microprocessor or Application Specific Integrated Circuit (ASIC), at least one storage device 210 and at least one communication interfacing device 220. The at least one storage device 210 may be any data storage device that may store program codes 214, accessed and executed by the at least one processing circuit 200. Examples of the at least one storage device 210 include but are not limited to a subscriber identity module (SIM), read-only memory (ROM), flash memory, random-access memory (RAM), Compact Disc Read-Only Memory (CD-ROM), digital versatile disc-ROM (DVD-ROM), Blu-ray Disc-ROM (BD-ROM), magnetic tape, hard disk, optical data storage device, non-volatile storage device, non-transitory computer-readable medium (e.g., tangible media), etc. The at least one communication interfacing device 220 is preferably at least one transceiver and is used to transmit and receive signals (e.g., data, messages and/or packets) according to processing results of the at least one processing circuit 200.

Figure 3:
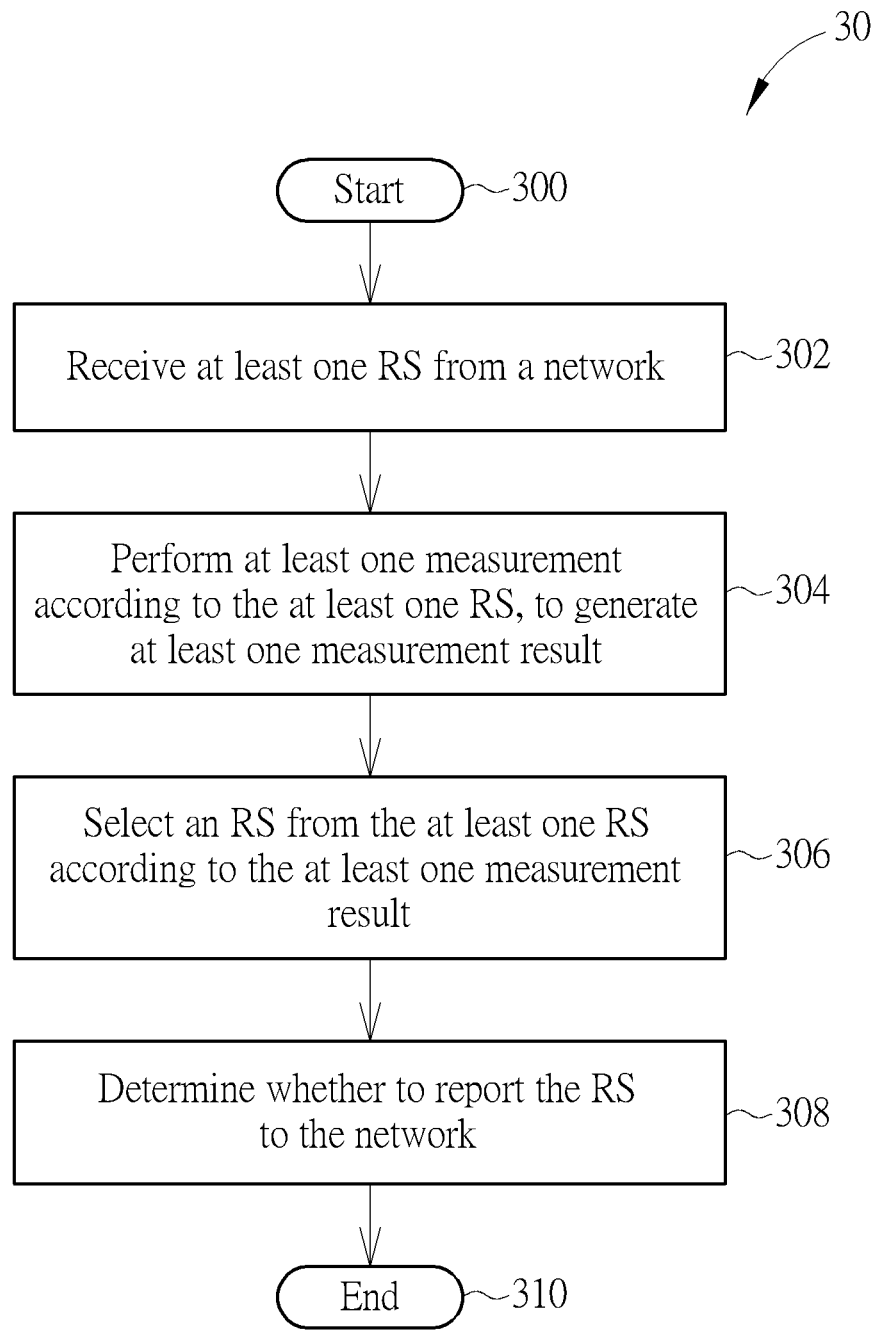
FIG. 3 is a flowchart of a process according to an example of the present invention.

FIG. 3 is a flowchart of a process 30 according to an example of the present invention. The process 30 may be utilized in a communication device (e.g., the communication device 20 in FIG. 2), to handle a reference signal (RS) reporting. The process 30 may be compiled into the program codes 214 and includes the following steps:

Step 300: Start.

Step 302: Receive at least one RS from a network (e.g., the network 12 in FIG. 1).

Step 304: Perform at least one measurement according to the at least one RS, to generate at least one measurement result.

Step 306: Select an RS from the at least one RS according to the at least one measurement result.

Step 308: Determine whether to report the RS to the network.

Step 310: End.

According to the process 30, the communication device 20 receives (e.g., is configured with) at least one (e.g., candidate) RS from the network 12. The communication device 20 performs at least one measurement according to the at least one RS, to generate at least one measurement result. The communication device 20 selects an RS from the at least one RS according to the at least one measurement result. Then, the communication device 20 determines (e.g., calculates and/or obtains) whether to report the RS to the network 12. That is, whether to report the RS to the network 12 is determined by the communication device 20. In other words, the communication device 20 determines to report the RS to the network 12 according to its needs (e.g., whether the reported RS is outdated). Thus, the network 12 performs a beam adjustment properly according to the (e.g., updated) RS. The RS may be a beam, a new beam (e.g., for the 5G system), a new beam RS (e.g., for the 5G system), but is not limited herein.

Realization of the process 30 is not limited to the above description. The following examples may be applied for realizing the process 30.

In one example, the at least one RS is associated with at least one beam. In one example, the communication device 20 determines whether to report the RS to the network 12 according to a triggering condition. The communication device 20 may determine to report the RS to the network 12 if (e.g., when) the triggering condition is satisfied. In one example, the triggering condition is satisfied, if a first threshold is greater than a value 0 and a counter is greater than or equal to the first threshold. In one example, the communication device 20 determines (e.g., declares) a beam failure, if the counter is greater than or equal to a second threshold. The first threshold may be smaller than the second threshold. That is, the communication device 20 determines to report the RS to the network 12, before the communication device 20 determines the beam failure. Thus, the probability of the beam failure is decreased. In one example, the communication device 20 determines (e.g., declares) a beam unstable, if the counter is greater than or equal to the first threshold.

In one example, the communication device 20 determines to report the RS to the network 12, if a quality of an RS associated with a serving beam (e.g., currently serving the communication device) is smaller (e.g., worse) than a third threshold dedicated for a new (e.g., updated) RS reporting. In one example, the communication device 20 reports the RS to the network 12 via transmitting at least one of an identity (ID) of the RS, a quality of the RS, the counter or a component carrier (CC) index for the RS to the network 12.

In one example, the communication device 20 receives (e.g., is configured with) a UL resource for reporting the RS to the network 12 from (e.g., by) the network 12 (e.g., via an RRC message, a medium access control control element (MAC CE) or a DL control information (DCI)). In one example, the communication device 20 determines to report the RS (e.g., by activating the UL resource) to the network 12, if the first threshold is equal to the value 0. In one example, the communication device 20 determines to report the RS (e.g., by activating the UL resource) to the network 12, if the second threshold is smaller than or equal to a predetermined value, a fixed value or a predefined value.

The communication device 20 may receive (e.g., may be configured with) the first threshold, the second threshold and/or the third threshold from (e.g., by) the network 12.

In one example, the communication device 20 determines to report the RS to the network 12, if the communication device 20 receives an activation command for reporting the RS from the network 12 (e.g., via an RRC message, a MAC CE or a DCI). The communication device 20 may transmit a hybrid automatic repeat request acknowledgement (HARQ-ACK) to the network 12 in response to the activation command. According to a channel state information RS (CSI-RS) reported by the communication device 20, the network 12 may transmit the activation command to the communication device 20 to activate the communication device reporting the RS. In one example, the communication device 20 determines to stop reporting the RS to the network 12, if the communication device 20 receives a deactivation command for stopping reporting the RS from the network 12 (e.g., via an RRC message, a MAC CE or a DCI). The communication device 20 may transmit a HARQ-ACK to the network 12 in response to the deactivation command. According to the CSI-RS reported by the communication device 20, the network 12 may transmit the deactivation command to the communication device 20 to deactivate the communication device reporting the RS.

In one example, the communication device 20 transmits information of another RS (e.g., another of the at least one RS), if the communication device 20 determines (e.g., finds) that a quality of the other RS is greater (e.g., better) than the quality of the RS (e.g., one of the at least one RS). In one example, the communication device 20 does not transmit the information of the other RS or transmits information indicating that no RS is found, if the communication device 20 determines (e.g., finds) that the quality of the other RS is smaller (e.g., worse) than the quality of the RS.

In one example, the communication device 20 reports the RS to the network 12 by performing a first UL transmission associated with the RS to the network 12 via a first UL resource of a plurality of UL resources, wherein the at least one RS is associated with the plurality of UL resources. The first UL resource may include at least one of a first random access channel (RACH) resource, a first physical uplink shared channel (PUSCH) resource, a first physical uplink control channel (PUCCH) resource or a first sound reference signal (SRS) resource. A format of the first PUCCH resource may include a format 0 or a format 1. The communication device 20 may be configured with (e.g., scheduled) a request ID, for the communication device 20 to request the RS reporting (e.g., updating) in the first UL transmission. A first sequence of the first PUCCH resource may be the same as a second sequence of a PUCCH resource used by the communication device for a scheduling request (SR). The first sequence and the second sequence may include different cyclic shifts.

In one example, the communication device 20 reports the RS to the network 12 by performing a second UL transmission associated with the first UL transmission to the network 12 via a second UL resource of the plurality of UL resources. The second UL resource may include at least one of a second RACH resource, a second PUSCH resource (e.g., for reporting a CSI measured by the communication device), a second PUCCH resource or a second SRS resource. In one example, the second PUSCH resource may include at least one of information of a frequency domain, an offset of the frequency domain corresponding to the first UL resource, a resource allocation of a time domain or an offset of the time domain corresponding to the first UL resource. A format of the second PUCCH resource may include a format 2, a format 3 or a format 4. In one example, the second PUCCH resource may include a signal quality (e.g., RS received power (RSRP), RS received quality (RSRQ) or signal to interference and noise ratio (SINR)) associated with the RS, the counter or information of the other RS (e.g., an ID of the other RS and/or corresponding signal quality of the other RS), if the quality of the other RS is found greater (e.g., better) than the quality of the RS. That is, the second UL transmission is for the communication device 20 to (e.g., implicitly) inform the network 12 of the beam unstable.

In one example, the communication device 20 receives information associated with a search space (e.g., for recovery) from the network 12, e.g., by monitoring a control resource set (CORESET) in a slot (e.g., a CORESET with the lowest CORESET ID (e.g., 0) in the slot) where the communication device 20 is scheduled to perform a DL reception (e.g., physical downlink shared channel (PDSCH)), in response to reporting the RS. In one example, a quasi co-located (QCLed) assumption of the search space is associated with the RS. In one example, the information includes (e.g., is) a transmission configuration indicator (TCI) field in a DCI for scheduling the DL reception via a DL resource. The communication device 20 may perform the DL reception via the DL resource according to an indicated TCI codepoint in the TCI field of the DCI. In one example, the DL resource is QCLed with the RS, if the TCI field indicates information of "non-available" or a predetermined value. In one example, the DL resource is QCLed with other RS(s) indicated in the TCI field, if the TCI field indicates information other than the "non-available" or other than the predetermined value. In one example, the communication device 20 may perform a third UL transmission to the network 12 via a (e.g., the same) spatial filter for (e.g., used for) the first UL transmission, if the TCI field indicates the information of "non-available" or the predetermined value.

The communication device 20 may be configured with (or update) correspondences between the TCI field (e.g., indicating TCI codepoints), a TCI state for the CORESET, the QCLed assumption (e.g., parameter) and corresponding RSs via an RRC message, a MAC CE (e.g., activation command) and/or a DCI received from the network 12.

In one example, the communication device 20 completes (e.g., finishes) reporting the RS, until (e.g., when, if) a timer (e.g., a beam failure timer (BFT) timer) for detecting the beam failure expires. In one example, the communication device 20 completes reporting the RS, if the communication device 20 receives information including at least one of an RRC message, a MAC CE (e.g., activation command) and/or a DCI for updating the TCI state for the CORESET or if the communication device 20 receives a physical downlink control channel (PDCCH) for triggering an aperiodic CSI reporting, e.g., for measuring the RS or the other RS. In one example, the communication device 20 completes reporting the RS, if the communication device 20 determines (e.g., declares) the beam failure.

In one example, the communication device 20 stops reporting the RS to the network 12, until (e.g., when, if) a timer (e.g., a silence timer) for stop reporting the RS expires. In one example, the timer starts running, when (e.g., if) the first number of consecutive reporting the RS is greater than or equal to a fourth threshold. In one example, the fourth threshold is the minimum number of consecutive reportings of "the same RS". In one example, the communication device 20 stops reporting the RS to the network 12, when the communication device 20 selects another RS from the at least one RS, wherein a quality of the other RS is greater (e.g., better) than the quality of the RS. In one example, the timer starts running, when (e.g., if) the second number of consecutive reportings of "no RS" is greater than or equal to a fifth threshold. In one example, the fifth threshold is the minimum number of consecutive reportings of "no selected RS".

In one example, a plurality of spatial relation information between the at least one RS and the plurality of the UL resources is indicated by a plurality of TCI states, activated by a plurality of MAC CEs, or configured by a plurality of RRC messages. In one example, each of the plurality of spatial relation information includes a failure detection resource (e.g., the RS associated with the serving beam). In one example, each of the plurality of spatial relation information includes the spatial filter for the first UL transmission. That is, the second UL transmission is performed by using the (e.g., the same) spatial filter for (e.g., used for) the first UL transmission (e.g., RACH transmission). In one example, each of the plurality of spatial relation information includes the lowest CORESET ID (e.g., 0). The communication device 20 may perform the DL reception via the RS associated with the serving beam used for the lowest CORESET ID. In one example, each of the plurality of spatial relation information includes an SRS resource indicator.

In one example, the communication device 20 determines to report the RS via (e.g., on) a SCell, and performs the first UL transmission and the second UL transmission via a PCell or a primary secondary cell group (SCG) cell (PScell). The communication device 20 may not need to perform the first UL transmission, if the communication device 20 (e.g., already) has a UL grant on the PCell or the PSCell. In one example, the second PUSCH resource includes at least one of the ID of the RS, the quality of the RS, the counter or at least one failed CC index for the RS.

In one example, the communication device 20 receives (e.g., is configured with) at least one sixth threshold associated with the at least one RS, respectively, for reporting the at least one RS. That is, each of the at least one sixth threshold is associated with one of the at least one RS. For example, the communication device 20 determines to report the one of the at least one RS to the network 12, if one of the at least one sixth threshold associated with the one of the at least one RS is greater than the value 0 and the counter is greater than or equal to the one of the at least one sixth threshold. The communication device 20 may perform a fourth transmission via a fourth UL resource for reporting the one of the at least one RS, if the communication device 20 starts to report information associated with the one of the at least one RS. A spatial relation information of the fourth UL resource may not be associated with the one of the at least one RS. The fourth UL resource may include at least one of an ID of the one of the at least one RS, the quality of the one of the at least one RS, the counter or at least one failed CC index for the one of the at least one RS. The one of the at least one RS may or may not be the RS mentioned above.

Figure 4:
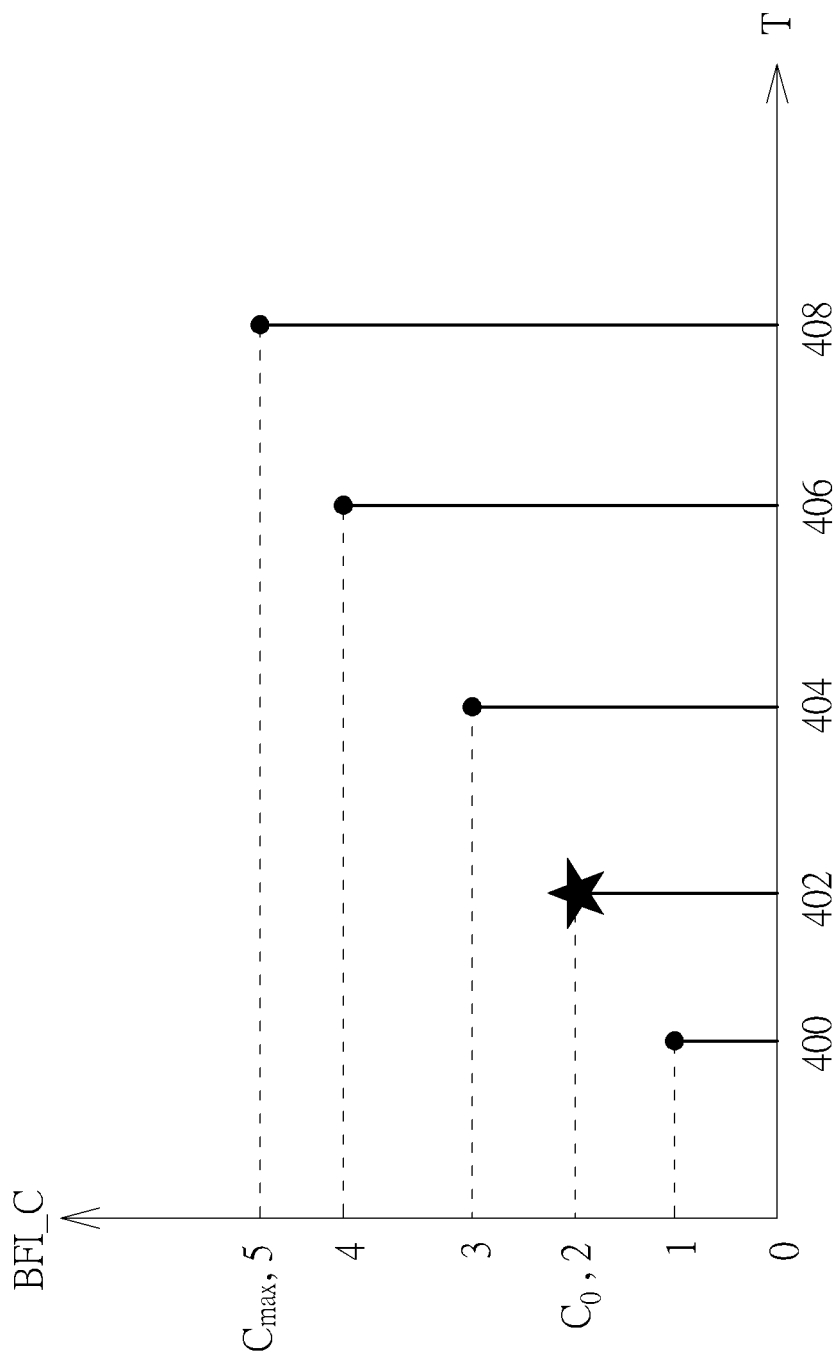
FIG. 4 is a schematic diagram of a triggering condition for reporting an RS according to an example of the present invention.

FIG. 4 is a schematic diagram of a triggering condition for reporting an RS according to an example of the present invention. FIG. 4 may be applied to FIGS. 1-3. There are time instants 400-408 in X-axis representing a time dimension T and there are values 0-5 in Y-axis representing a counter BFI_C. A communication device (e.g., the communication device mentioned in the paragraphs directed to FIGS. 1-3) is configured with a threshold $C_{max}$ (e.g., 5, but is not limited herein) by a network (e.g., the network mentioned in the paragraphs directed to FIGS. 1-3), wherein the threshold $C_{max}$ is for the communication device to determine (e.g., declare) a beam failure. The communication device is further configured with a threshold $C_0$ (e.g., 2, but is not limited herein) by the network, wherein the threshold $C_0$ is for triggering the communication device to report a (e.g., new, updated) RS. The communication device sets the counter BFI_C to zero, wherein the counter BFI_C is for the communication device to count the number of the beam unstable.

At the time instant 400, the communication device determines the beam unstable and the counter BFI_C is increased by 1 (e.g., 1). The communication device determines not to report the RS to the network, if (e.g., when, because) the threshold $C_0$ (e.g., 2) is greater than a value 0 and the counter BFI_C (e.g., 1) is smaller than the threshold $C_0$ (e.g., 2). At the time instant 402, the communication device determines the beam unstable and the counter BFI_C is increased by 1 (e.g., 2). The communication device determines to report the RS to the network, if the threshold $C_0$ (e.g., 2) is greater than the value 0 and the counter BFI_C (e.g., 2) is equal to the threshold $C_0$ (e.g., 2). That is, the triggering condition is satisfied (e.g., shown as a star pattern) and the communication device is triggered to report the RS to the network. At the time instant 404 or the time instant 406, the communication device determines to report the RS to the network, if the threshold $C_0$ (e.g., 2) is greater than the value 0 and the counter BFI_C (e.g., 3 or 4) is greater than the threshold $C_0$ (e.g., 2). At the time instant 408, the communication device determines the beam unstable and the counter BFI_C is increased by 1 (e.g., 5). The communication device determines the beam failure, if the counter BFI_C (e.g., 2) is equal to the threshold $C_{max}$ (e.g., 5).

Figure 5:
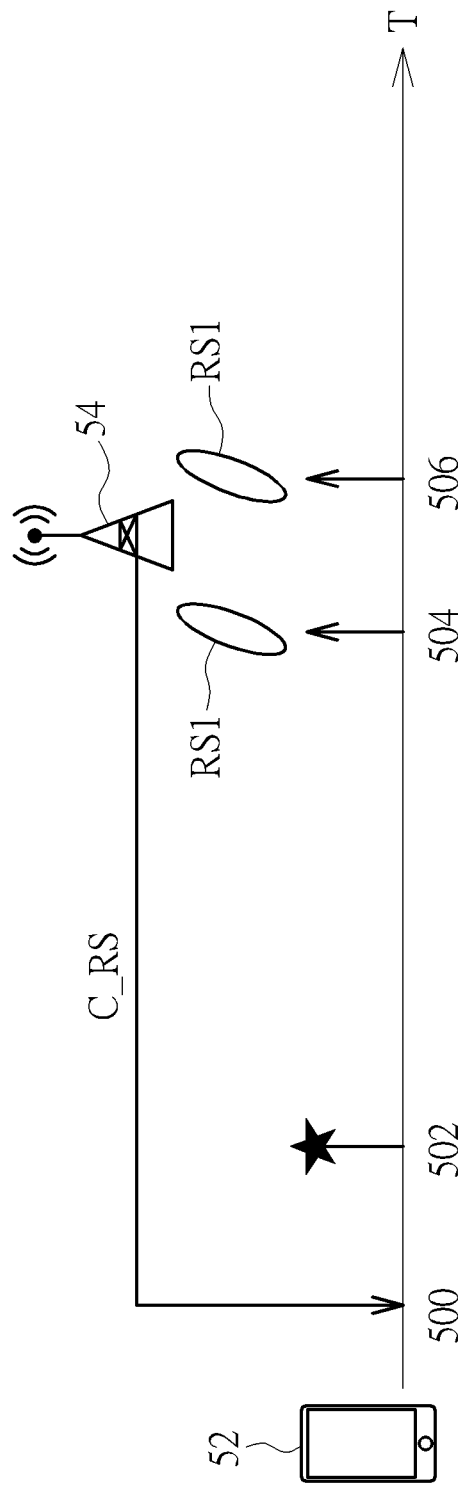
FIG. 5 is a timing diagram of reporting an RS according to an example of the present invention.

FIG. 5 is a timing diagram of reporting an RS according to an example of the present invention. FIG. 5 may be applied to FIGS. 1-4. There are time instants 500-506 in X-axis representing a time dimension T. A UE 52 reports a (e.g., new, updated) RS to a gNB 54. At the time instant 500, the UE is configured with at least one RS C_RS, wherein each of the at least one RS C_RS is associated with at least one of a RACH resource and/or a PUCCH resource. At the time instant 502, the UE determines that a triggering condition for reporting the RS is satisfied (e.g., shown as the star pattern). At the time instant 504, the UE 52 selects an RS RS1 (e.g., with the highest quality of at least one quality of the at least one RS C_RS) as the RS from the at least one candidate RS C_RS, if the at least one quality of the at least one RS C_RS is greater than or equal to a threshold dedicated for a new (e.g., updated) RS reporting (e.g., the third threshold mentioned in FIG. 3). Then, the UE 52 performs a first UL transmission to the gNB 54 via the RACH resource associated with the RS RS1, if the quality of the RS is greater than or equal to the threshold.

At the time instant 506, the UE 52 performs a second UL transmission to the gNB 54 via the PUCCH resource associated with the RS RS1 if the UE 52 determines a beam unstable, after performing the first UL transmission. That is, the UE 52 performs the first UL transmission and the second UL transmission by using the same spatial filter.

In one example, the gNB 54 obtains the beam failure of the UE 52 when the gNB 54 receives (e.g., only) the first UL transmission, and the gNB 54 uses the RS to communicate with the UE 52. In one example, the gNB 54 obtains the beam unstable of the UE when the gNB 54 receives (e.g., both) the first UL transmission and the second UL transmission. In one example, the UE 52 transmits additional information (e.g., other information of the RS which is not transmitted in the first UL transmission) of the RS to the network in the second UL transmission.

Figure 6:
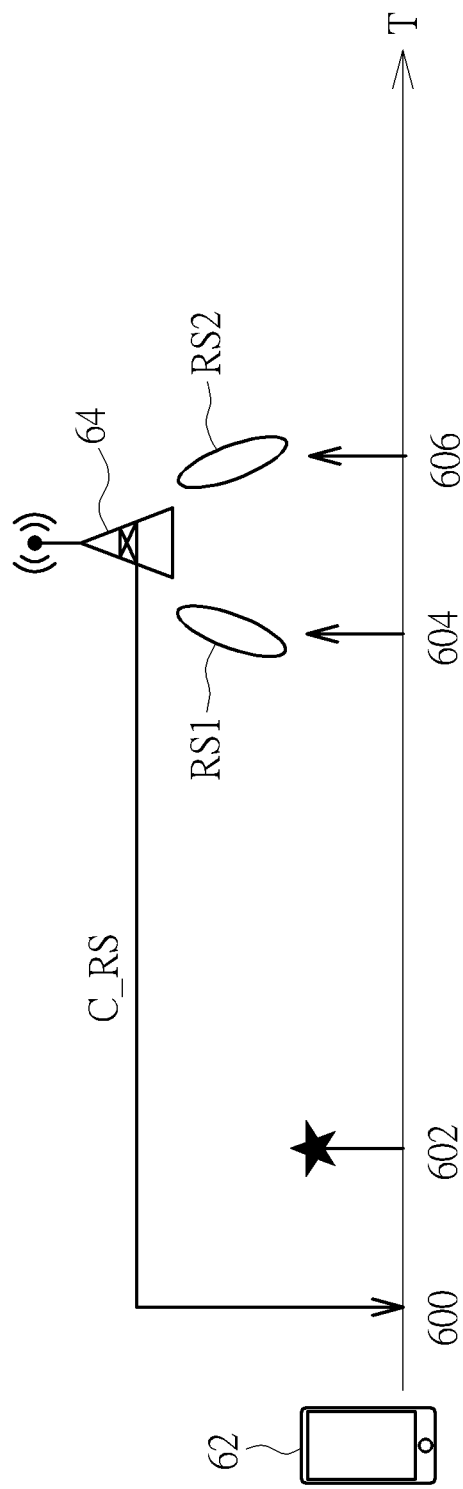
FIG. 6 is a timing diagram of reporting an RS according to an example of the present invention.

FIG. 6 is a timing diagram of reporting an RS according to an example of the present invention. FIG. 6 may be applied to FIGS. 1-4. There are time instants 600-606 in X-axis representing a time dimension T. A UE 62 reports a new (e.g., updated) RS to a gNB 64. The time instants 600-604 are similar to the time instants 500-504, and are not repeated herein for brevity. At the time instant 606, the UE 62 performs a second UL transmission to the gNB 64 via a PUCCH resource associated with an RS RS2 associated with a serving beam if the UE 62 determines the beam unstable, after performing the first UL transmission. That is, the UE 62 performs the first UL transmission and the second UL transmission by using different spatial filters. The RS RS2 associated with the serving beam may be a failure detection resource. The UE 62 may perform a DL reception via the RS RS2 associated with the serving beam used for the lowest CORESET ID.

Figure 7:
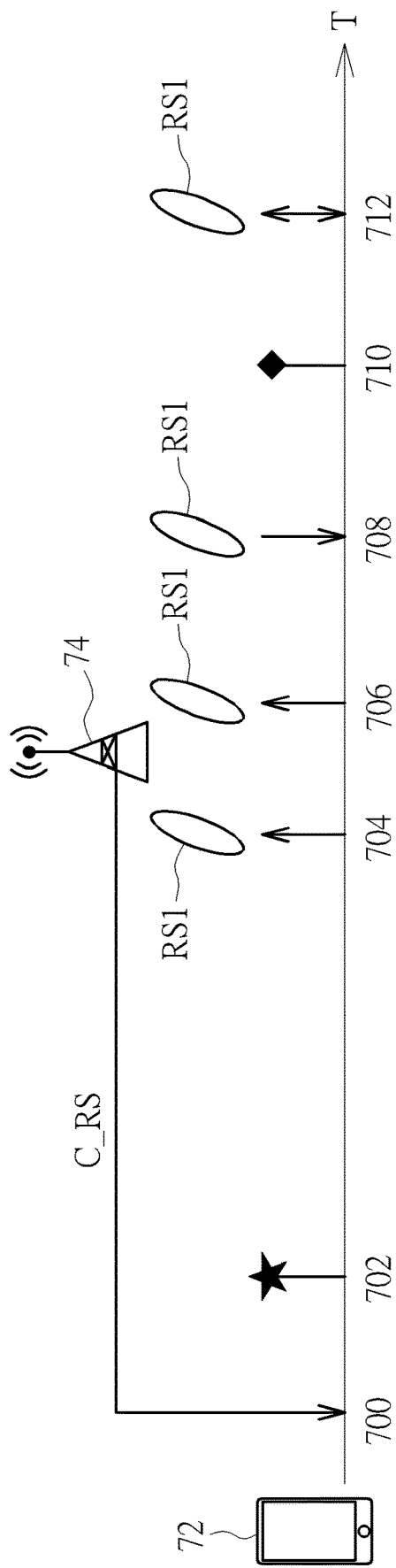
FIG. 7 is a timing diagram of reporting an RS according to an example of the present invention.

FIG. 7 is a timing diagram of reporting an RS according to an example of the present invention. FIG. 7 may be applied to FIGS. 1-5. There are time instants 700-712 in X-axis representing a time dimension T. A UE 72 reports a (e.g., new, updated) RS to a gNB 74. The time instants 700-704 are similar to the time instants 500-504, and are not repeated herein for brevity. The time instant 706 is similar to the time instant 506 or the time instant 606, and are not repeated herein for brevity. At the time instant 708, the UE 72 receives information associated with a search space from the network by using the RS RS1, in response to reporting the RS RS1. At the time instant 710, the UE 72 completes reporting the RS RS1 to the gNB 74 (e.g., shown as a diamond pattern). At the time instant 712, the UE 72 performs a DL reception from the gNB 74 or a UL transmission to the gNB 74 according to the information by using the RS RS1.

Figure 8:
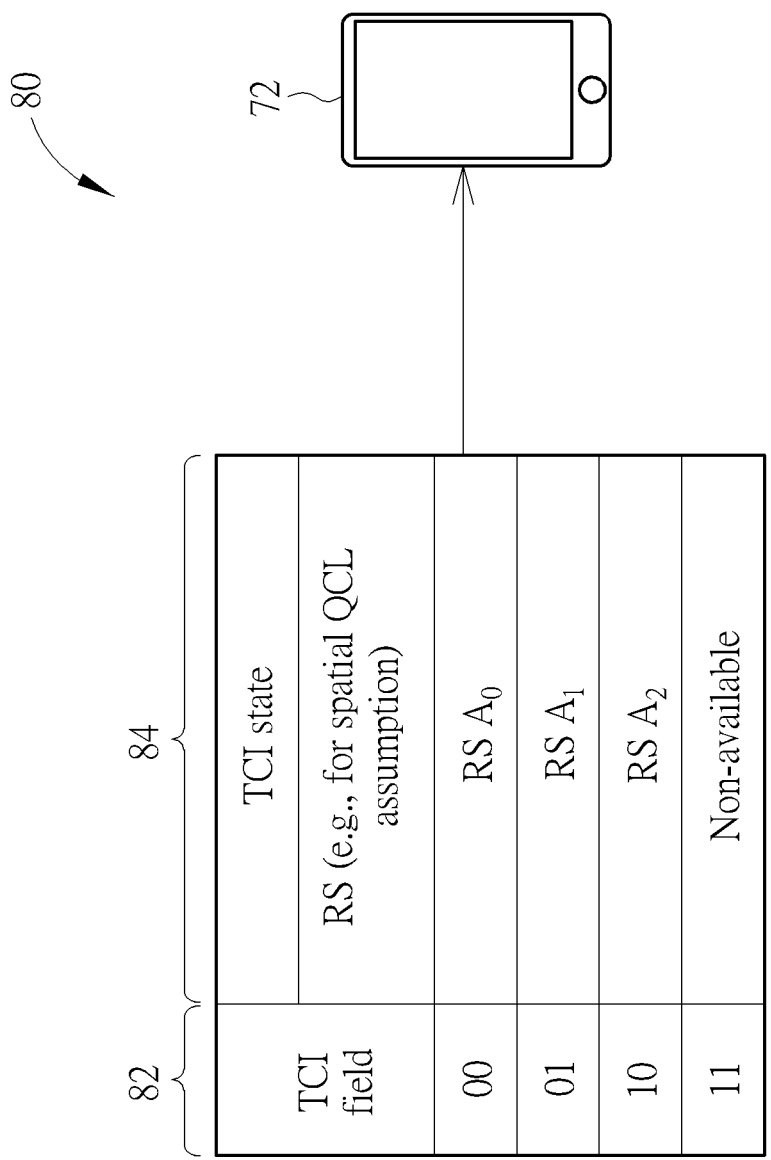
FIG. 8 is a schematic diagram of a TCI field-TCI state mapping table according to an example of the present invention.

FIG. 8 is a schematic diagram of a TCI field-TCI state mapping table 80 according to an example of the present invention, wherein corresponding RSs are also shown. The TCI field-TCI state mapping table 80 includes correspondences between a TCI field 82 (indicating TCI codepoints), a TCI state 84, a QCL assumption and corresponding RSs (e.g., correspondences in the mapping table). The TCI field indicates 2 bits information such as "00", "01", "10" and/or "11", i.e., the TCI codepoints are "00", "01", "10" and/or "11".

FIG. 8 may be applied to FIGS. 1-7. The UE 72 may be configured with the TCI field-TCI state mapping table 80 via an RRC message, a MAC CE and/or a DCI, and the UE 72 may store the TCI field-TCI state mapping table 80. Then, the UE 72 may receive the information associated with the search space from the network, e.g., by monitoring a CORESET (e.g., a CORESET with the lowest CORESET ID (e.g., 0) in a slot), in response to reporting the RS RS1. In one example, the information includes a codepoint "11" indicating "non-available" in the TCI field-TCI state mapping table 80 or a predetermined value. The UE 72 performs a DL reception from the gNB 74 by determining (e.g., assuming) that at least one antenna port of the DL reception is QCLed with the RS RS1. In another example, the information includes codepoints "00", "01" and "11" indicating "RS A0", "RS A1" and "RS A2", respectively. The UE 72 performs DL receptions from the gNB 74 by determining (e.g., assuming) that at least one antenna port of the DL receptions is QCLed with a "RS A0", "RS A1" and "RS A2", respectively.

Figure 9:
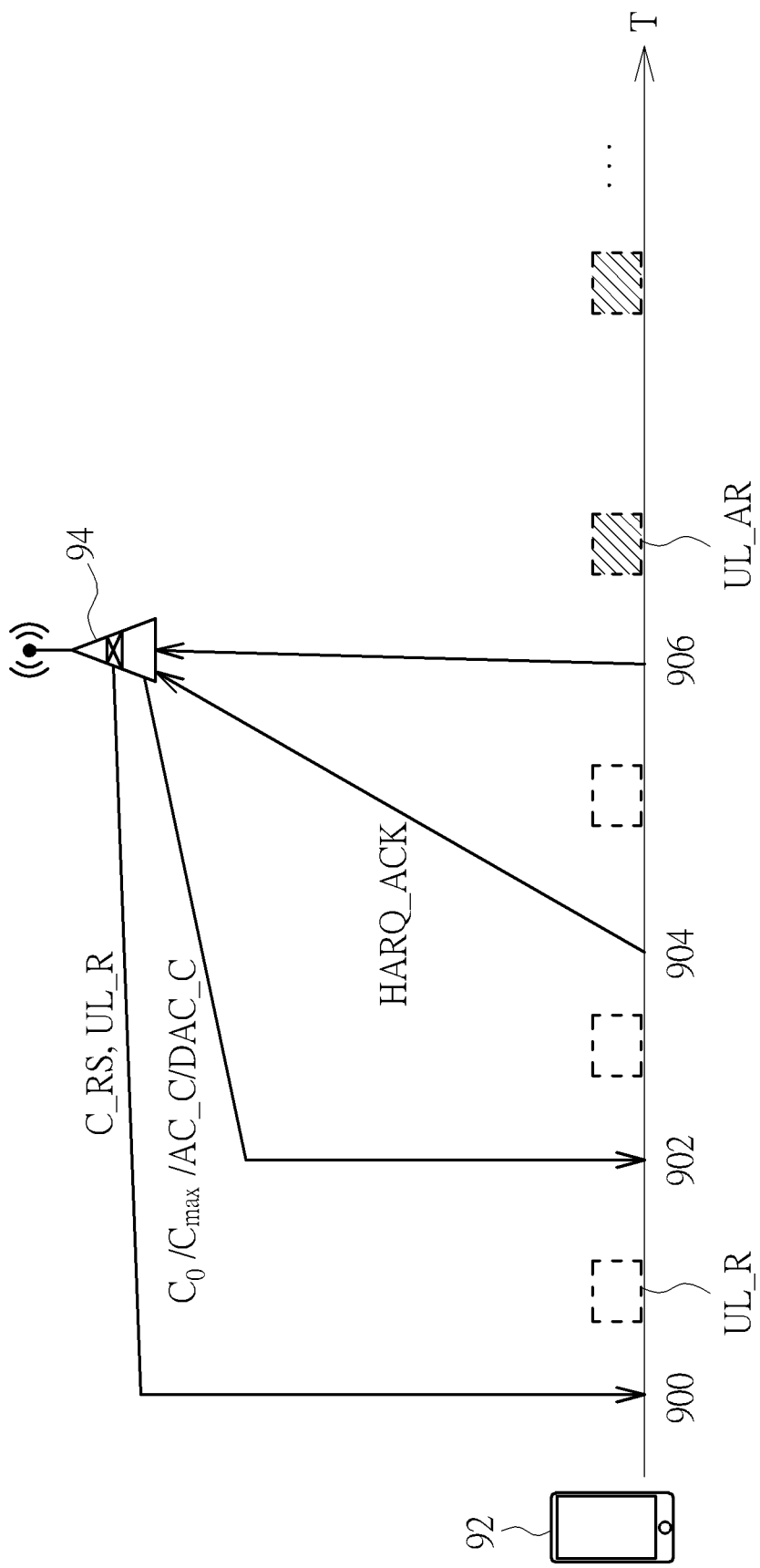
FIG. 9 is a timing diagram of reporting an RS according to an example of the present invention.

FIG. 9 is a timing diagram of reporting an RS according to an example of the present invention. FIG. 9 may be applied to FIGS. 1-8. There are time instants 900-906 in X-axis representing a time dimension T A UE 92 reports a (e.g., new, updated) RS to a gNB 94. At the time instant 900, the UE 92 is configured with at least one RS C_RS and a UL resource UL R (e.g., shown as an unfilled square pattern) for reporting the RS. At the time instant 902, the UE 92 is configured with a threshold $C_0$ (e.g., 0) or a $C_{max}$ (e.g., smaller than or equal to a predetermined value, a fixed value or a predefined value), or receives an activation command AC_C or a deactivation command DAC_C.

At the time instant 904, the UE 92 transmits a HARQ-ACK HARQ ACK to the gNB 94 in response to the activation command AC_C or the deactivation command DAC_C. At the time instant 906 (e.g., shown as a square pattern), the UE 92 activates the UL resource UL R to generate an activated UL resource UL_AR (e.g., shown as a filled square pattern) and reports the RS to the gNB 94 according to the activated UL resource UL R in response to the threshold $C_0$ (e.g., 0), the $C_{max}$ or the activation command AC_C, or the UE 92 stops reporting the RS to the gNB 94 in response to the deactivation command DAC_C.

Figure 10:
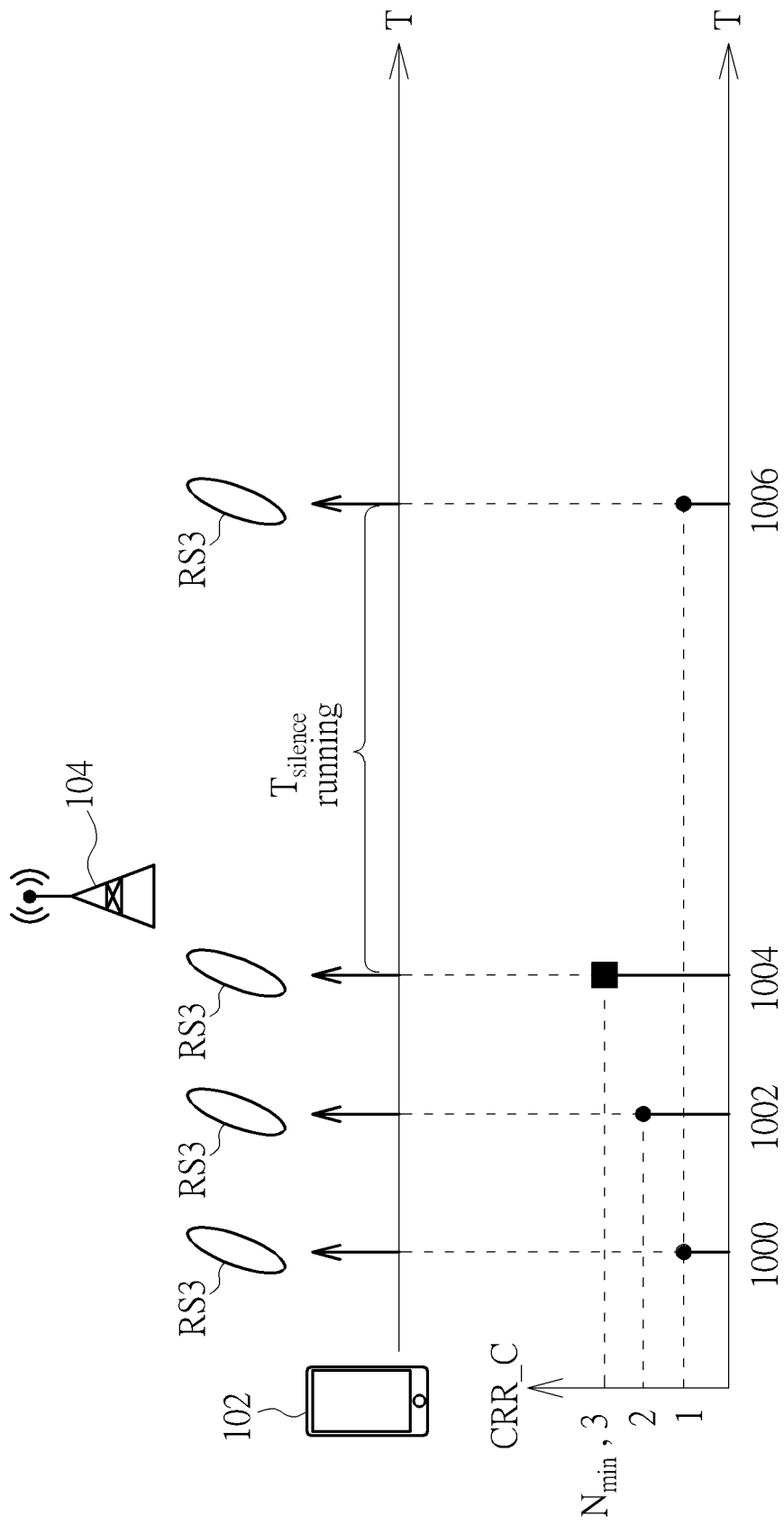
FIG. 10 is a timing diagram of reporting an RS according to an example of the present invention.

FIG. 10 is a timing diagram of reporting an RS according to an example of the present invention. FIG. 10 may be applied to FIGS. 1-9. There are time instants 1000-1006 in X-axis representing a time dimension T and there are values 0-3 in Y-axis representing a counter CRR_C. For ease of explanation, two identical x-axes are illustrated in FIG. 10.

A UE 102 reports a (e.g., new, updated) RS to a gNB 104. The UE 102 is configured with a threshold $N_{min}$ (e.g., 3, but is not limited herein) by the gNB 104, wherein the threshold $N_{min}$ is the minimum number of consecutive reportings of "the same RS". The UE 102 sets the counter CRR_C to zero, wherein the counter CRR_C is for the UE 102 to count the number of consecutive reportings of "the same RS".

At the time instant 1000, the UE 102 reports an RS R3 (or no selected RS RSX) to the gNB 104, and the counter CRR_C is increased by 1 (e.g., CRR_C=CRR_C+1=1, and is shown as a circle pattern). At the time instant 1002, the UE 102 reports the RS R3 (or no selected RS RSX) to the gNB 104, and the counter CRR_C is increased by 1 (e.g., CRR_C=CRR_C+1=2, and is shown as the circle pattern). At the time instant 1004, the UE 102 reports the RS R3 (or no selected RS RSX) to the gNB 104, and the counter CRR_C C is increased by 1 (e.g., CRR_C=CRR_C+1=3, and is shown as a square pattern). That is, the UE 102 consecutively reports the same RS (e.g., the RS R3) (or no selected RS RSX) to gNB 104 three times, and the counter CRR_C is equal to the threshold $N_{min}$ (e.g., 3). Thus, a timer T silence starts running. The UE 102 stops reporting any RS to the gNB 104, until the timer $T_{silence}$ expires. At the time instant 1006, the timer $T_{silence}$ expires, and the UE 102 resets the counter CRR_C to 0. Then, the UE 102 starts (e.g., re-start) to report the same RS (e.g., the RS R3) to the gNB 104 and the counter CRR_C C is increased by 1 (e.g., CRR_C=CRR_C+1=1, and is shown as the circle pattern), or starts to report a different RS from the RS R3 or no selected RS RSX to the gNB 104.

Figure 11:
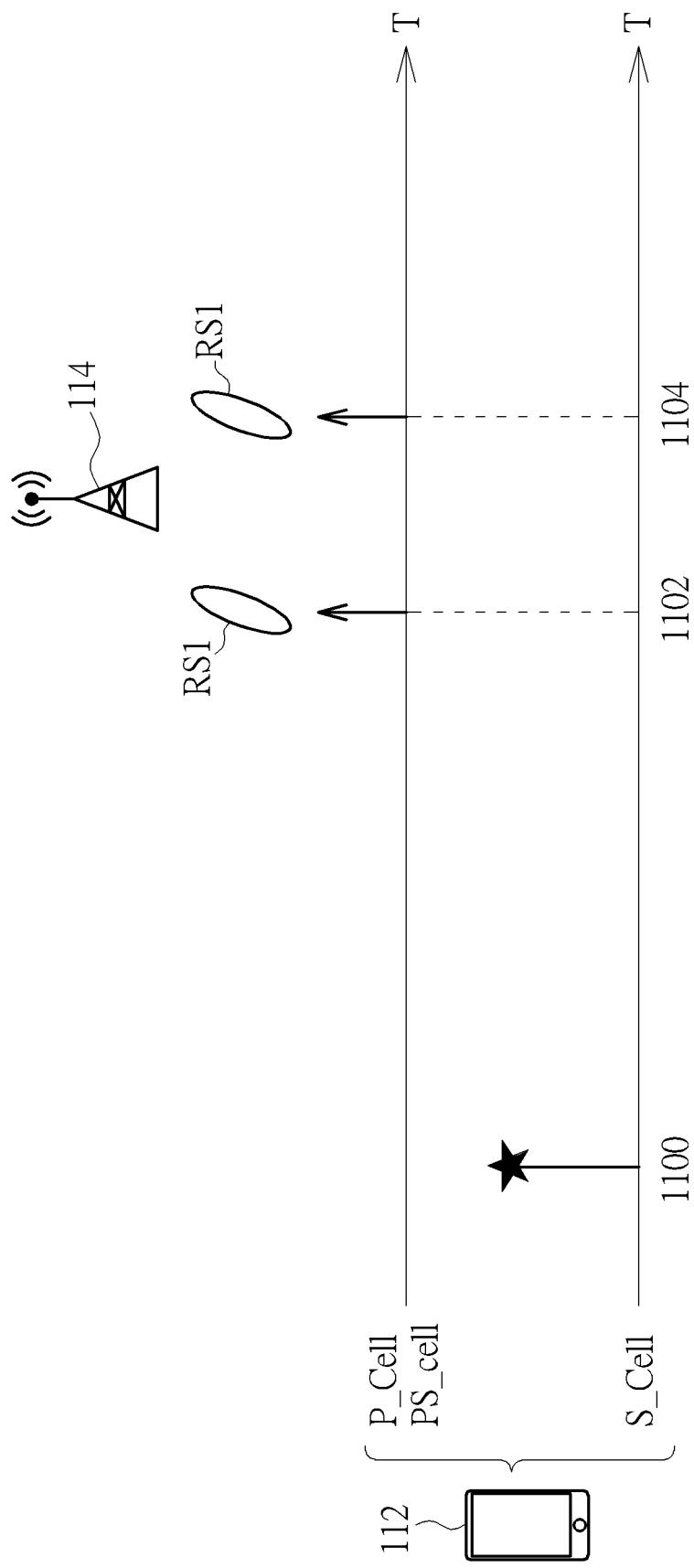
FIG. 11 is a timing diagram of reporting an RS according to an example of the present invention.

FIG. 11 is a timing diagram of reporting an RS according to an example of the present invention. FIG. 11 may be applied to FIGS. 1-10. There are time instants 1100-1106 in X-axis representing a time dimension T. For ease of explanation, two identical x-axes are illustrated in FIG. 11. A UE 112 reports a (e.g., new, updated) RS to a gNB 114 on a PCell P Cell, a PScell PS Cell or a Scell S Cell. At the time instant 1100, the UE 112 determines that a triggering condition for reporting the RS is satisfied (e.g., shown as the star pattern) via the Scell S Cell. At the time instant 1102, the UE 112 performs a first UL transmission via a first UL resource associated with an RS RS1 selected by the UE 112, on the PCell P Cell or the PScell PS Cell. At the time instant 1104, the UE 112 performs a second UL transmission via a second UL resource associated with the RS RS1, on the PCell P Cell or the PScell PS Cell. That is, the determination and the transmissions are performed via different types of cells.

The operation of "determine" described above may be replaced by the operation of "compute", "calculate", "obtain", "generate", "output", "use", "choose/select", "decide" or "is configured to", "declare". The operation of "monitor" described above may be replaced by the operation of "detect", "receive", "sense" or "obtain". The phrase of "according to" described above may be replaced by "in response to". The phrase of "associated with" described above may be replaced by "of" or "corresponding to". The term of "via" described above may be replaced by "on", "in" or "at".

Those skilled in the art should readily make combinations, modifications and/or alterations on the abovementioned description and examples. The abovementioned description, steps and/or processes including suggested steps can be realized by means that could be hardware, software, firmware (known as a combination of a hardware device and computer instructions and data that reside as read-only software on the hardware device), an electronic system, or combination thereof. An example of the means may be the communication device 20.

Examples of the hardware may include analog circuit(s), digital circuit(s) and/or mixed circuit(s). For example, the hardware may include ASIC(s), field programmable gate array(s) (FPGA(s)), programmable logic device(s), coupled hardware components or combination thereof. In another example, the hardware may include general-purpose processor(s), microprocessor(s), controller(s), digital signal processor(s) (DSP(s)) or combination thereof.

Examples of the software may include set(s) of codes, set(s) of instructions and/or set(s) of functions retained (e.g., stored) in a storage unit, e.g., a computer-readable medium. The computer-readable medium may include SIM, ROM, flash memory, RAM, CD-ROM/DVD-ROM/BD-ROM, magnetic tape, hard disk, optical data storage device, non-volatile storage unit, or combination thereof. The computer-readable medium (e.g., storage unit) may be coupled to at least one processor internally (e.g., integrated) or externally (e.g., separated). The at least one processor which may include one or more modules may (e.g., be configured to) execute the software in the computer-readable medium. The set(s) of codes, the set(s) of instructions and/or the set(s) of functions may cause the at least one processor, the module(s), the hardware and/or the electronic system to perform the related steps.

Examples of the electronic system may include a system on chip (SoC), system in package (SiP), a computer on module (CoM), a computer program product, an apparatus, a mobile phone, a laptop, a tablet computer, an electronic book or a portable computer system, and the communication device 20.

To sum up, the present invention provides a communication device for handling an RS reporting. The communication device determines to report the RS to the network according to its needs (e.g., whether the reported RS is outdated). Thus, the network may perform a beam adjustment properly according to the (e.g., updated) RS. Thus, the probability of the beam failure is decreased and the performance of the beamforming is improved.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A communication device for handling a reference signal (RS) reporting, comprising:
   at least one storage device; and
   at least one processing circuit, coupled to the at least one storage device, wherein the at least one storage device stores instructions, and the at least one processing circuit is configured to execute the instructions of:
   receiving at least one reference signal (RS) from a network;
   performing at least one measurement according to the at least one RS, to generate at least one measurement result;
   selecting an RS from the at least one RS according to the at least one measurement result; and
   determining whether to report the RS to the network;
   performing a first uplink (UL) transmission associated with the RS to the network via a first UL resource of a plurality of UL resources, wherein the at least one RS is associated with the plurality of UL resources;

performing a second UL transmission associated with the first UL transmission to the network via a second UL resource of the plurality of UL resources.

2. The communication device of claim 1, wherein the communication device determines to report the RS to the network, if a first threshold is greater than a value 0 and a counter is greater than or equal to the first threshold.

3. The communication device of claim 2, wherein the communication device reports the RS to the network via transmitting at least one of an identity (ID) of the RS, a quality of the RS or the counter to the network.

4. The communication device of claim 2, wherein the communication device determines to report the RS to the network, if the first threshold is equal to the value 0.

5. The communication device of claim 1, wherein the communication device determines to report the RS to the network, if a second threshold is smaller than or equal to a predetermined value.

6. The communication device of claim 1, wherein the communication device determines to report the RS to the network, if receiving an activation command for reporting the RS from the network.

7. The communication device of claim 1, wherein the first UL resource comprises at least one of a first random access channel (RACH) resource, a first physical uplink shared channel (PUSCH) resource, a first physical uplink control channel (PUCCH) resource or a first sound reference signal (SRS) resource.

8. The communication device of claim 1, wherein the second UL resource comprises at least one of a second RACH resource, a second PUSCH resource, a second PUCCH resource or a second SRS resource.

9. The communication device of claim 8, wherein the second PUSCH resource comprises at least one of an information of a frequency domain, an offset of the frequency domain corresponding to the first UL resource, a resource allocation of a time domain or an offset of the time domain corresponding to the first UL resource.

10. The communication device of claim 1, wherein the at least one processing circuit is further configured to execute the instructions of:
receiving an information associated with a search space from the network, in response to reporting the RS.

11. The communication device of claim 10, wherein a spatial quasi co-located (QCLed) assumption of the search space is associated with the RS.

12. The communication device of claim 10, wherein the information comprises a transmission configuration indicator (TCI) field in a downlink (DL) control information (DCI) for scheduling a DL reception via a DL resource.

13. The communication device of claim 12, wherein the DL resource is QCLed with the RS, if the TCI field indicates an information of "non-available" or a predetermined value.

14. The communication device of claim 13, wherein the communication device performs a third UL transmission to the network via a spatial filter for the first UL transmission, if the TCI field indicates the information of "non-available" or the predetermined value.

15. The communication device of claim 1, wherein the at least one processing circuit is further configured to execute the instructions of:
stopping reporting the RS to the network, until a timer expires or when selecting another RS from the at least one RS.

16. The communication device of claim 15, wherein the timer starts running, when the first number of consecutive reporting the RS is greater than or equal to a third threshold.

17. The communication device of claim 16, wherein the third threshold is the minimum number of consecutive reportings of "the same RS".

18. The communication device of claim 15, wherein the timer starts running, when the second number of consecutive reporting no selected RS is greater than or equal to a fourth threshold.

19. The communication device of claim 18, wherein the fourth threshold is the minimum number of consecutive reportings of "no selected RS".

20. The communication device of claim 1, wherein a plurality of spatial relation information between the at least one RS and the plurality of the UL resources are indicated by a plurality of TCI states, activated by a plurality of medium access control control elements (MAC CEs), or configured by a plurality of radio resource control (RRC) messages.

21. The communication device of claim 20, wherein each of the plurality of spatial relation information comprises at least one of a failure detection resource, the spatial filter for the first UL transmission, a lowest control resource set (CORESET) ID or a SRS resource indicator.

* * * * *